R. G. MANIFOLD.
GEARING FOR MOTOR VEHICLES.
APPLICATION FILED JULY 6, 1916.
1,240,748.
Patented Sept. 18, 1917.
3 SHEETS—SHEET 2.
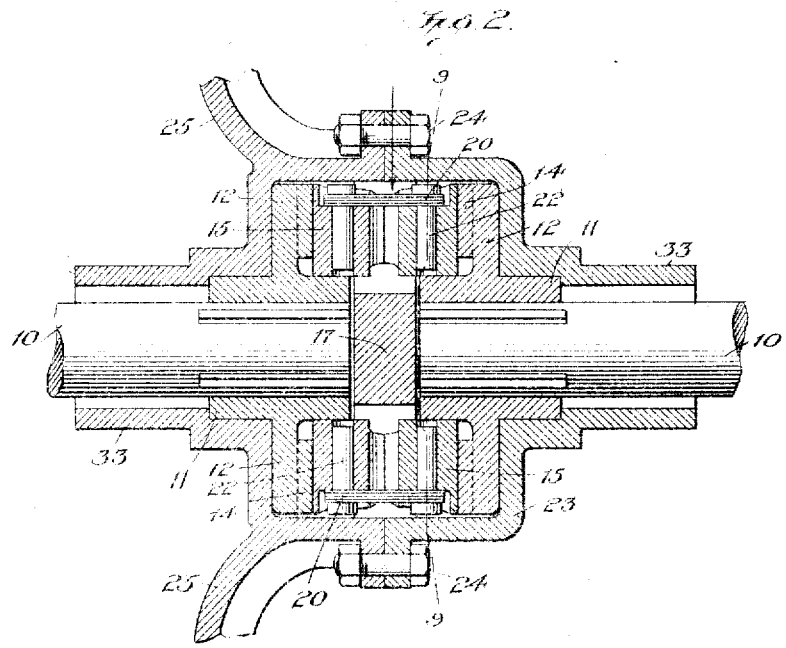
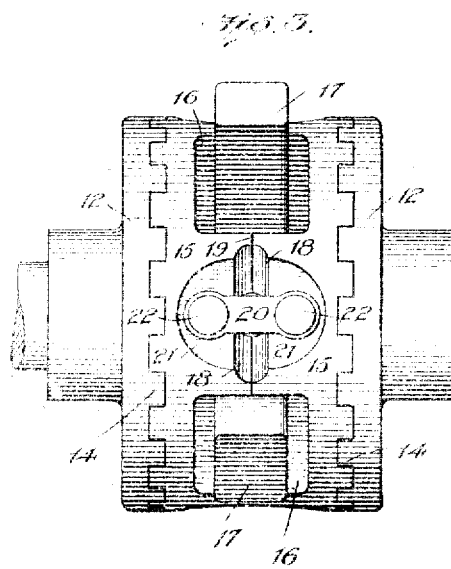
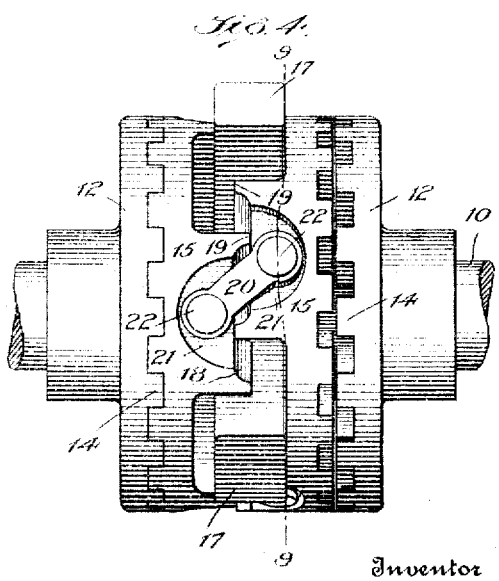
Witness
Edwin L. Bradford
Inventor
R. G. Manifold
By
Greene & Greene,
Attorneys

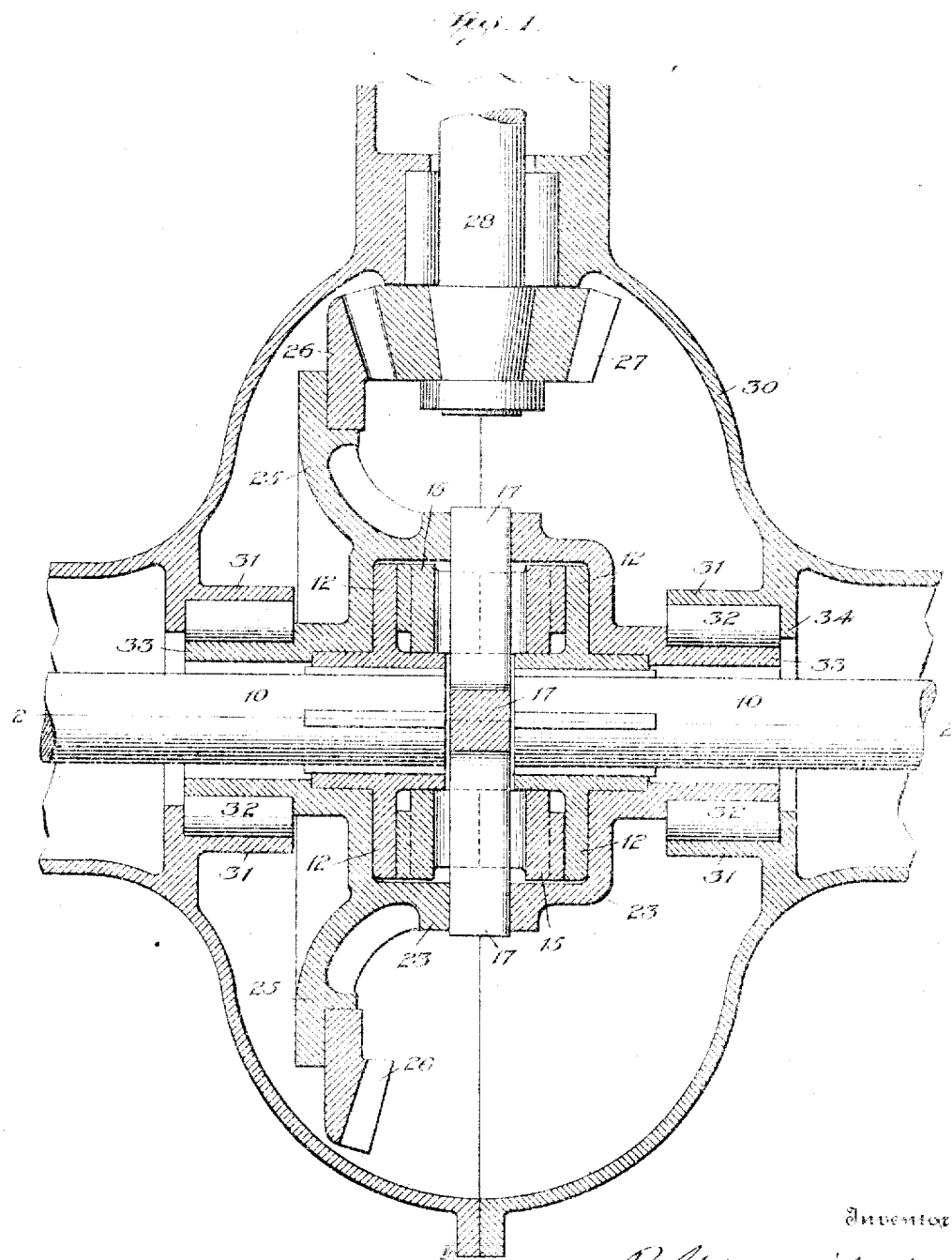

R. G. MANIFOLD.
GEARING FOR MOTOR VEHICLES.
APPLICATION FILED JULY 6, 1916.

1,240,748.

Patented Sept. 18, 1917.
3 SHEETS—SHEET 3.

Witness
Edwin L. Bradford

Inventor
R. G. Manifold
By Greene & Greene,
Attorneys

UNITED STATES PATENT OFFICE.

RICHARD G. MANIFOLD, OF RIVERSIDE, CALIFORNIA.

GEARING FOR MOTOR-VEHICLES.

1,240,748.   Specification of Letters Patent.   Patented Sept. 18, 1917.

Application filed July 6, 1916. Serial No. 107,768.

*To all whom it may concern:*

Be it known that I, RICHARD G. MANIFOLD, a citizen of the United States, and resident of the city of Riverside, in the county of Riverside and State of California, have invented certain new and useful Improvements in Gearing for Motor-Vehicles, of which the following is a specification, reference being had therein to the accompanying drawing.

Differential gearing commonly used in motor vehicles has many generally recognized disadvantages which it is the object of this invention to eliminate, and this end is reached by using a divided driven axle to each part of which power is transmitted by a clutch automatically disconnected from the power when the corresponding wheel tends to rotate faster than its companion, power then being applied only to the slower moving wheel. On a curve of small radius the outer wheel moving in a longer path, the inner wheel must slip if both rotate at the same speed, and if the wheels are independently power driven and one by reason of sand or mud can obtain only sub-normal hold upon the earth, it spins too rapidly and exerts, nevertheless, little tractive force. In either case, power is expended in wearing the tire, which at best wears far more rapidly than other parts of the machine.

By disengaging the faster running wheel from the power, the power is temporarily applied solely to driving the other, and the machine is less readily stalled, tire wear is greatly decreased, and skidding largely avoided, while at the same time, complicated gearing is made unnecessary.

In the accompanying drawings,

Figure 1 is a section in the plane passing through my devices and the axes of the power shaft and the axles.

Fig. 2 is a section on the line 2—2 of Fig. 1.

Figs. 3 and 4 are views in the direction of the arrow of Fig. 2, Fig. 3 showing both clutches engaged and Fig. 4 showing one disengaged by relative rotation.

Figure 5:
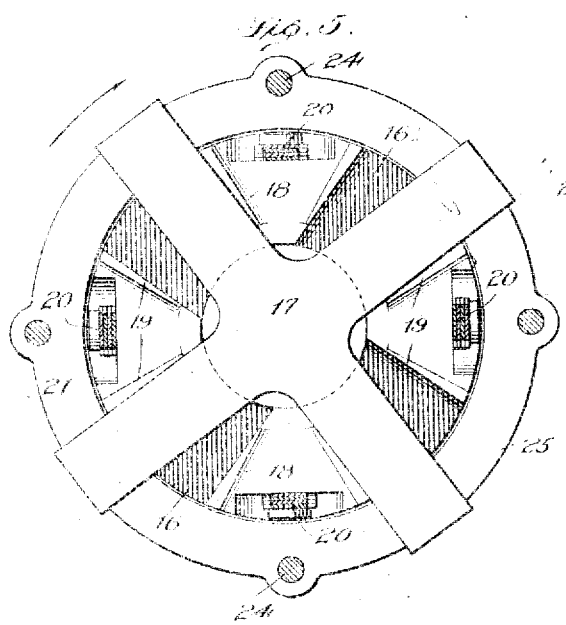
Fig. 5 is a view looking from the right in Figs. 2, 3, 4, with parts on the right of the joint in the casing removed.
Figure 6:
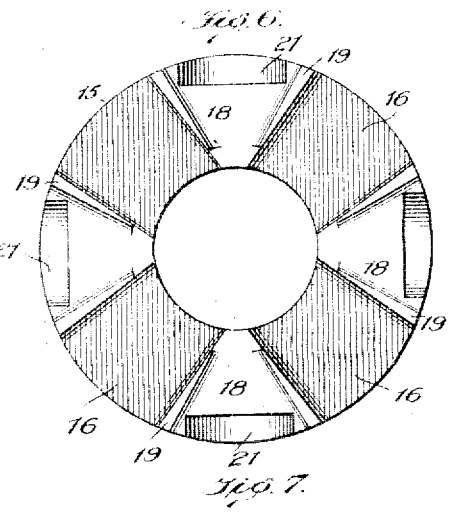
Fig. 6 is a detached view showing one face of an annular central member seen in Fig. 5.
Figure 7:
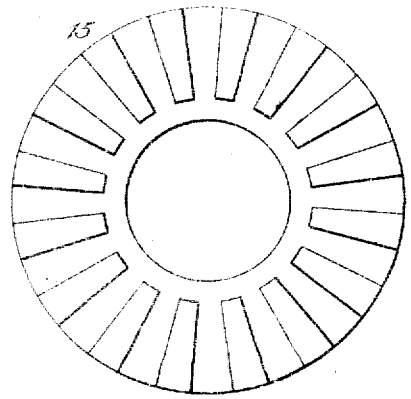
Fig. 7 shows the opposite face of the same member.
Figure 8:
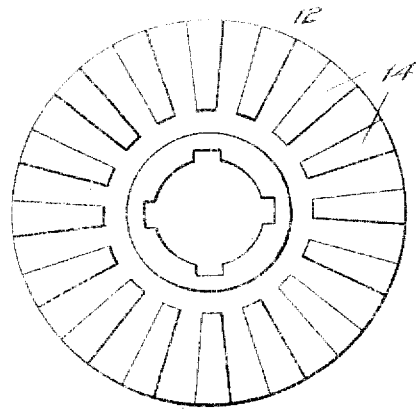
Fig. 8 shows the working face of a member engaging the face seen in Fig. 7.
Figure 9:
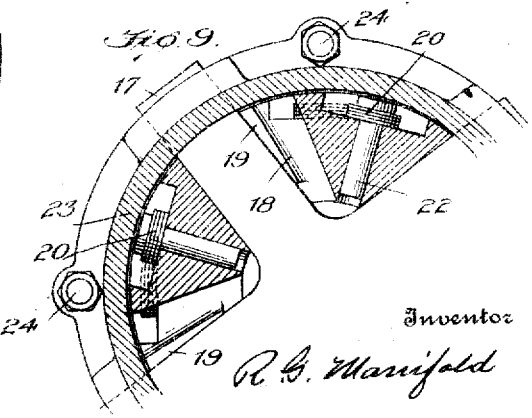
Fig. 9 is a section on the line 9—9, Fig. 4.

In these figures 10, 10 are alining axle members having their adjacent ends spaced apart and on the inner end portion of each is splined or otherwise suitably mounted the long hub 11 of a clutch disk 12 having on its inner face an annular series of radial teeth 14 to engage analogous teeth on an annular clutch member 15 mounted to rotate and slide on the inner end portion of the corresponding hub 11. The clutch members 15 extend equally inward, or toward each other, and approximately meet in a plane perpendicular to and equidistant from the adjacent ends of the axles, but are cut away to form openings 16 to receive the materially smaller arms of a plane spider 17 which approximately fits the space between the axle ends and has its arms angularly equidistant. The clutch members are further cut away at 18 midway between the openings 16 so that when they are slightly rotated relatively their meeting faces at 19 are out of registry and either member may move toward its companion far enough to disengage its teeth from the teeth of the corresponding clutch member 12. The openings 16 are large enough to permit this movement without striking the spider arms. The members 15 are peripherally connected midway between the openings 16 by plane laminated spring links 20 lying in a broad peripheral recess 21 and each loosely pivoted at each end on headed pins 22 inserted in the corresponding clutch members. If one of the clutch members 15 be rotated from the postion shown in Fig. 3 to that of Fig. 4, the faces 19 becoming disengaged, the link 20, draws that member inward disengaging its teeth from the one clutch disk 12, and at the same time the link is itself twisted, its resulting force tending to return the parts to initial position. These clutch members are inclosed by a heavy casing 23 made in two parts cut away to receive the arms of the spider and secured together by bolts 24 and to an annular flange 25 of one of the parts is fixed an annular bevel gear 26 driven by a pinion 27 on a power shaft 28, whereby the spider 17 is positively rotated at a speed determined by the engine. The casing 23 closely fits the outer faces of the clutch members 12 and their hubs 11, so that outward strain upon them is safely resisted, although they may rotate freely within the casing. The working parts are all inclosed in a heavy case 30 made in two parts, as usual, and provided internally with strong projections 31 in which are formed cylindrical races for series of long cylindrical rollers 32 in two series, serving as bearings, respectively, for the outer end portions, or hubs 33 of the rotary casing 23, lying within and also abutting the rollers which themselves abut flanges 34 integral with the case 30.

When the power shaft 28 is rotated, power is transmitted through the pinion 27 and gear 26 to one of the casing members 23 and, through the arms of the spider 17 clamped between the two and lying partly in each, to the other member 23, so that both these members and the intervening spider rotate together. The rotation of the spider arms carries them bodily against the walls of the openings 16 in the registering clutch members 15 which thus normally rotate with the casing 23 and the spider. If the teeth of both these clutch members 15 are engaged with the teeth of the corresponding disks 12, which is normally the case, those disks are also rotated, and since each is splined to its axle 10, both axle members are rotated at the same speed in the same direction. Should one of the axle members rotate faster than its companion or faster than it would be driven for the moment by the power shaft, the corresponding clutch members 12, 15, advance leaving the forward side of the spider arms, the rear sides of which are at some distance from the rear wall of the opening 16, the faces 19 pass out of registry, as indicated in Fig. 4, and the links 20 draw the teeth of the clutch member 15 out of engagement with the teeth of the corresponding disk 12, leaving this disk with its axle member and wheel entirely free to rotate as it will. The link in thus swinging about one of its pins is twisted and its resilient force tends to restore, or aid in restoring, the advance member 15 to initial position and practically as soon as the speed of the released disk 12 falls to that of the companion member still driven by the power, the link swings and the clutch member passes outward into engagement with the disk 12 as shown in Fig. 3. Obviously either clutch member 15 may thus move out of engagement and return to normal position, or, in other words, when either wheel rotates faster than the other, it is freed from the driving devices and rotates as it may. There is then no power lost in compelling the wheels to rotate at the same speed with consequent slipping and wearing of the tires, and when one wheel, only, tends to spin in soft ground, the entire driving force is applied to the other wheel.

What I claim is:

1. The combination with two separated alined shafts having spaced facing clutch members fixed thereto, respectively, of two co-acting clutch members between and normally in positive engagement, respectively, with the members first mentioned and adapted to drive them positively in either direction, means for rotating said co-acting members, and means whereby force tending to rotate one of the shafts faster than its companion may disengage the corresponding co-acting clutch member.

2. The combination with two alined shafts having facing clutch members spaced apart and fixed to the shafts, respectively, of co-acting clutch members normally engaging the first mentioned members, respectively, and having abutting portions which extend fully across the space between the two first clutch members, when the shafts are rotating at the same speed, and positively prevent disengagement, and means whereby unequal rotation disengages the clutch of the faster rotating shaft.

3. The combination with two alined shafts and two facing spaced clutch members fixed to the shafts, respectively, of two co-acting clutch members normally engaging the members first mentioned, respectively, having non-inclined meeting faces normally preventing disengagement of either co-acting clutch member, and cut away alongside said faces to allow the latter to move out of meeting position when the co-acting clutch members rotate unequally, means for rotating both the members last mentioned while allowing either to advance with respect to the other, and means for automatically disengaging the advanced clutch member from the companion member with which it engages.

4. The combination with two alined driven shafts having their adjacent ends spaced apart, of clutch members fixed to said ends, respectively, two other clutch members engaging the members first mentioned, respectively, means for driving said other clutch members together, and a link pivoted to said other clutch members normally holding both in engagement with the clutch members, respectively and adapted to disengage one of them from its companion clutch member, when the said one rotates faster than its companion.

5. The combination with two alined driven shafts having their adjacent ends spaced apart, of a spider interposed between said ends, a power rotated member engaging the spider arms at some distance from the axes of the shafts and compelling the spider to rotate, clutch members fixed to the ends of the shafts, respectively, co-acting clutch members normally engaging the members first mentioned, respectively, and cut away upon their opposite sides to receive the spider arms in recesses which allow said members limited movements of rotation with respect to the spider and parallel to the axes of the shafts, and a link pivotally connecting said co-acting clutch members and adapted to draw toward the spider either co-acting clutch member rotating faster than its companion.

6. The combination with two alined driven shafts having their adjacent ends spaced apart, of a spider interposed between said ends, a power rotated member engaging the spider arms at some distance from the axes of the shafts and compelling the spider to rotate, clutch members fixed to the ends of the shafts, respectively, co-acting clutch members normally engaging the members first mentioned, respectively, and cut away upon their opposite sides to receive the spider arms in recesses which allow said members limited movements of rotation with respect to the spider and parallel to the axes of the shafts, and a spring link pivotally connecting said co-acting clutch members and adapted to draw toward the spider either co-acting clutch member rotating faster than its companion, while itself put under tension tending to restore the parts to initial position.

7. The combination with two separated, alined shafts having spaced, facing clutch members fixed thereto respectively, of two co-acting clutch members between said facing clutch members and normally in engagement therewith, respectively, links normally approximately parallel to said shafts and having their ends pivoted to the co-acting members, respectively, and means for rotating said co-acting members; whereby said links normally tend to hold the co-acting clutch members in engagement but disengage either when its shaft rotates faster than its companion.

In testimony whereof I hereunto affix my signature.

RICHARD G. MANIFOLD.